(12) United States Patent
Wu

(10) Patent No.: US 11,419,420 B1
(45) Date of Patent: Aug. 23, 2022

(54) HIGHLY STABLE SEAT CHASSIS

(71) Applicant: Wudi Industrial (Shanghai) Co., Ltd., Shanghai (CN)

(72) Inventor: Peng Wu, Shanghai (CN)

(73) Assignee: WUDI INDUSTRIAL (SHANGHAI) CO., LTD., Shanghai (CN)

( * ) Notice: Subject to any disclaimer, the term of this patent is extended or adjusted under 35 U.S.C. 154(b) by 0 days.

(21) Appl. No.: 17/484,983

(22) Filed: Sep. 24, 2021

(30) Foreign Application Priority Data

Jul. 15, 2021 (CN) .......................... 202121609700.2

(51) Int. Cl.
    *A47C 7/00* (2006.01)
    *A47B 91/00* (2006.01)
    *F16B 12/42* (2006.01)
    *F16M 11/20* (2006.01)

(52) U.S. Cl.
    CPC ............ *A47C 7/004* (2013.01); *A47B 91/005* (2013.01); *F16B 12/42* (2013.01); *F16M 11/20* (2013.01)

(58) Field of Classification Search
    CPC .......... A47C 7/004; A47C 7/002; A47C 7/00; A47C 3/20; A47C 4/20; A47C 4/00; A47B 91/005; A47B 91/00; F16B 12/42; F16B 12/46; F16M 11/20
    USPC ............ 248/188.7, 188.1, 188.8, 188, 188.4, 248/188.9, 434, 187.1, 188.6, 346.01, 248/346.03, 688, 677, 678, 166, 177.1; 108/158.11
See application file for complete search history.

(56) References Cited

U.S. PATENT DOCUMENTS

| | | | | |
|---|---|---|---|---|
| 1,173,328 A | * | 2/1916 | Travers ................. | A47C 7/004 248/188.7 |
| 2,466,148 A | * | 4/1949 | Birr ...................... | A47C 7/004 248/188.7 |
| 2,634,075 A | * | 4/1953 | Mayzel ................. | A47F 5/06 248/170 |
| 3,236,485 A | * | 2/1966 | Staples ................. | A47B 13/06 248/188.1 |
| 3,443,782 A | * | 5/1969 | Fields ................... | A47B 13/04 248/188.7 |
| 3,682,425 A | * | 8/1972 | Vincent ................. | A47C 7/004 248/188.7 |
| 3,838,838 A | * | 10/1974 | Seaman, Jr. .......... | A47G 33/12 248/537 |
| 4,053,129 A | * | 10/1977 | Graff ..................... | A47C 7/004 248/188.7 |
| 4,084,776 A | * | 4/1978 | Cook ..................... | A47C 7/004 248/188.7 |
| 4,190,001 A | * | 2/1980 | Cecala ................... | A47B 13/04 108/161 |

(Continued)

*Primary Examiner* — Nkeisha Smith
(74) *Attorney, Agent, or Firm* — Bayramoglu Law Offices LLC

(57) ABSTRACT

The patent application discloses a highly stable seat chassis. The highly stable seat chassis may comprise a chair leg main body having a plurality of outstretching arms extending in a circumferential direction. The outstretching arms may comprise at least one first fixed arm, and a disassembly system. The disassembly system may be provided on the first fixed arm. The disassembly system comprises a dismounting arm and an insert plate fixedly connected to the dismounting arm. The first fixed arm is provided with a slot. The insert plate and the slot are provided with matching connecting holes.

15 Claims, 4 Drawing Sheets

(56) References Cited

U.S. PATENT DOCUMENTS

| | | | | |
|---|---|---|---|---|
| 5,082,222 | A * | 1/1992 | Hsu | F16M 11/242 |
| | | | | 248/170 |
| 5,102,079 | A * | 4/1992 | Lee | F16M 11/16 |
| | | | | 248/166 |
| 5,310,145 | A * | 5/1994 | Chen | F21S 6/006 |
| | | | | 248/170 |
| 5,402,973 | A * | 4/1995 | Haines | A47C 7/004 |
| | | | | 248/188.7 |
| 5,437,425 | A * | 8/1995 | Hou | A47C 7/004 |
| | | | | 248/166 |
| 5,501,419 | A * | 3/1996 | Huang | A47C 7/004 |
| | | | | 248/188 |
| 7,314,252 | B2 * | 1/2008 | Ohliv | A47C 7/004 |
| | | | | 248/188.7 |
| 9,518,696 | B1 * | 12/2016 | Lin | D06F 57/04 |
| 10,568,432 | B2 * | 2/2020 | Yu | F16M 11/00 |
| 2012/0068034 | A1 * | 3/2012 | Desmarais | B60B 33/0028 |
| | | | | 248/345.1 |
| 2012/0080572 | A1 * | 4/2012 | Lin | A47C 7/004 |
| | | | | 248/188.7 |
| 2013/0161456 | A1 * | 6/2013 | Adams | A47B 91/12 |
| | | | | 248/188.9 |

* cited by examiner

HIGHLY STABLE SEAT CHASSIS

CROSS REFERENCE TO RELATED APPLICATIONS

This patent application claims the benefit of Chinese utility model No. 202121609700.2 filed Jul. 15, 2021, of which is incorporated by reference herein.

TECHNICAL FIELD

The present invention relates to the technical field of seats, in particular to a highly stable seat chassis.

BACKGROUND

In the field of seat manufacturing technology, most of the five-star feet are used as the structure of the chair legs. The five-star feet not only facilitate people to rotate and move when sitting on the chair, but also increase the contact range between the chair feet and the ground, and improve people's sitting safety on the chair.

At present, most of the five claws of disassembly and assembly chair legs on the market adopt an embedded snap-in structure. If the product is used for a long time, it will cause abrasion and gaps, which will cause the product to appear loose or fall off and cannot be repaired. For this reason, the present utility patent application proposes a highly stable seat chassis that solves the above problems.

BRIEF SUMMARY OF THE INVENTION

The purpose of the present invention is to provide a highly stable seat chassis to solve the problems raised in the background art.

In order to achieve the above objective, the present invention provides the following technical solutions: a highly stable seat chassis, including a chair leg main body, the chair leg main body has a plurality of outstretching arms extending in the circumferential direction.

The extension arm includes at least one first fixed arm, and a disassembly system is provided on the first fixed arm.

The disassembly system includes a dismounting arm, and an insert plate fixedly connected to the dismounting arm. A slot is provided on the first fixed arm, and the insert plate and the slot are provided with matching connecting holes.

As a preferred technical solution of the utility patent application, the connecting hole matching the insert plate and the slot is an eccentric hole, and the mounting bolt is a cone-head bolt.

As a preferred technical solution of the present invention, a socket is provided in the middle of the chair leg body.

As a preferred technical solution of the present invention, the main body of the chair leg and the plurality of extension arms are integrally formed.

As a preferred technical solution of the present invention, the extension arm further includes a second fixed arm; there are two first fixed arms, three second fixed arms, two first fixed arms and three second fixed arms are arranged in a circumferential array of the chair leg main body, and the two first fixed arms are symmetrically arranged with one second fixed arm.

As a preferred technical solution of the present invention, the chair leg main body, the first fixed arm, the second fixed arm, the dismounting arm and the plug-in board are all shell structures, and mutually staggered reinforcing ribs are respectively arranged inside.

As a preferred technical solution of the present invention, a foot pad is provided at one end of the second fixed arm and the dismounting arm away from the chair leg main body, and the foot pad is in contact with the ground.

As a preferred technical solution of the present invention, the slot is provided with an arc ring outside the connecting hole.

As a preferred technical solution of the present invention, the connecting hole matching the inserting plate and the slot is an eccentric hole, and the mounting bolt is a cone-head bolt.

Compared with the prior art, the beneficial effects of the present utility patent applications are: the present utility patent application is a highly stable seat chassis. Through the disassembly and assembly system, the packaging volume of the finished product is reduced, thereby reducing the logistics cost and solving the existing problems. The looseness of the product cannot be repaired, and the stability is good.

Figure 1:
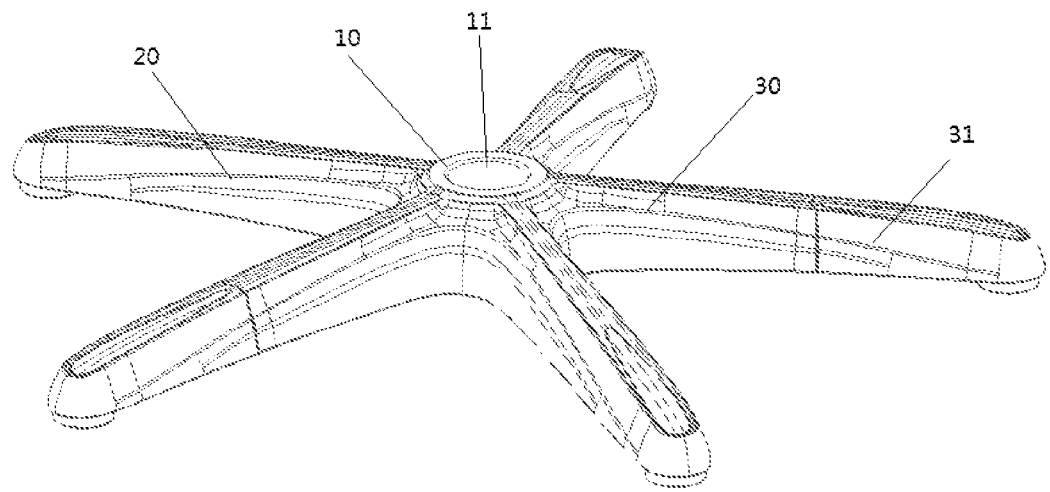
FIG. 1 is a schematic diagram of the overall structure assembly of the utility patent application.

In the Figure: 10, chair leg body; 11, socket; 20, second fixed arm; 30, first fixed arm; 301, slot; 302, arc circle; 31, disassembly system; 311, dismounting arm 312. Insert plate; 40. Feet pad; 50. Reinforcing ribs; 60. Connecting holes; 90, mounting bolt.

DETAILED DESCRIPTION OF THE INVENTION

The following description is merely illustrative in nature and is in no way intended to limit the disclosure, its application, or uses. As used herein, the phrase at least one of A, B, and C should be construed to mean a logical (A or B or C), using a non-exclusive logical "or." It should be understood that steps within a method may be executed in different order without altering the principles of the present disclosure. Disclosure of ranges includes disclosure of all ranges and subdivided ranges within the entire range.

The invention is not limited to the particular methodology, protocols, and reagents described herein because they may vary. Further, the terminology used herein is for the purpose of describing particular embodiments only and is not intended to limit the scope of the present invention. As used herein and in the appended claims, the singular forms "a," "an," and "the" include plural reference unless the context clearly dictates otherwise.

Unless defined otherwise, all technical and scientific terms and any acronyms used herein have the same meanings as commonly understood by one of ordinary skill in the art in the field of the invention. Although any methods and materials similar or equivalent to those described herein can be used in the practice of the present invention, the preferred methods, devices, and materials are described herein.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present technology that do not contain those elements or features.

Spatially relative terms, such as "inner," "outer," "beneath," "below," "lower," "above," "upper," "on," and their variants, may be used herein for ease of description to describe one element or feature's relationship to another element(s) or feature(s). Spatially relative terms may encompass different orientations of the device in use or operation. As used herein, when a coating, layer, or material is "applied onto," "applied over," "formed on," "deposited on," etc. another substrate or item, the added coating, layer, or material may be applied, formed, deposited on an entirety of the substrate or item, or on at least a portion of the substrate or item.

The broad teachings of the present disclosure can be implemented in a variety of forms. Therefore, while this disclosure includes particular examples, the true scope of the disclosure should not be so limited because other modifications will become apparent to the skilled practitioner upon a study of the specification and the following claims.

The foregoing disclosure and description of the invention is illustrative and explanatory thereof. Various changes in the details of the illustrated structures, construction and method can be made without departing from the true spirit of the invention.

The above shows and describes the basic principles, main features and advantages of the utility patent application Those skilled in the industry should understand that the present utility patent application is not limited by the above-mentioned embodiments. The above-mentioned embodiments and the description are only preferred examples of the present utility patent application and are not intended to limit the present utility patent application, without departing from the present utility patent application. Under the premise of spirit and scope, the present utility patent application will have various changes and improvements, and these changes and improvements fall within the scope of the claimed utility patent application. The scope of protection claimed by the utility patent application is defined by the appended claims and their equivalents.

Figure 2:
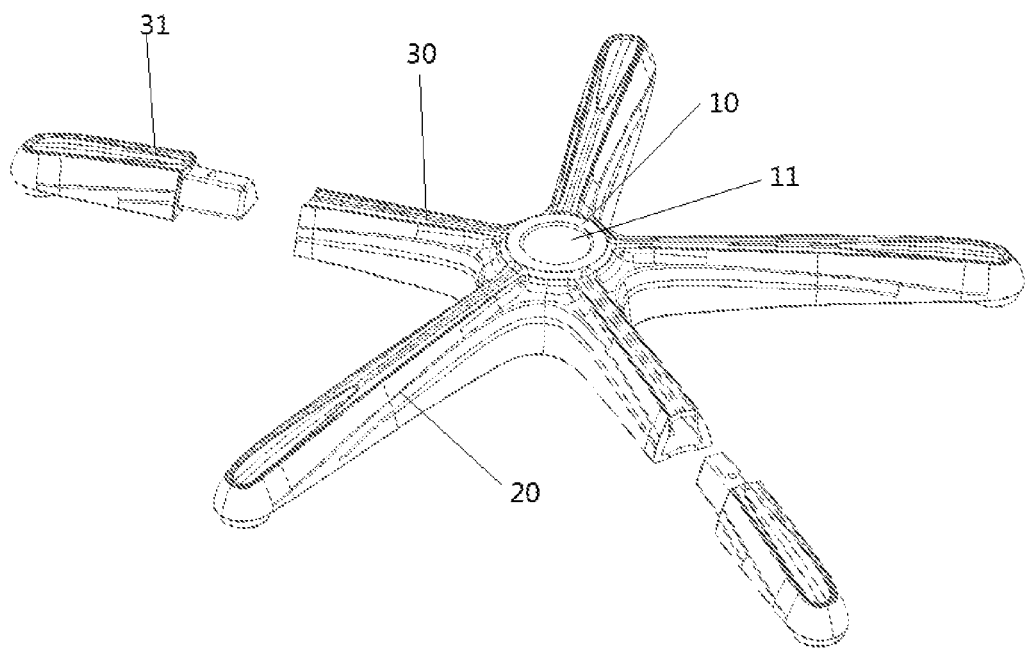
FIG. 2 is a schematic diagram of the disassembly of the overall structure of the utility patent application.
Figure 3:
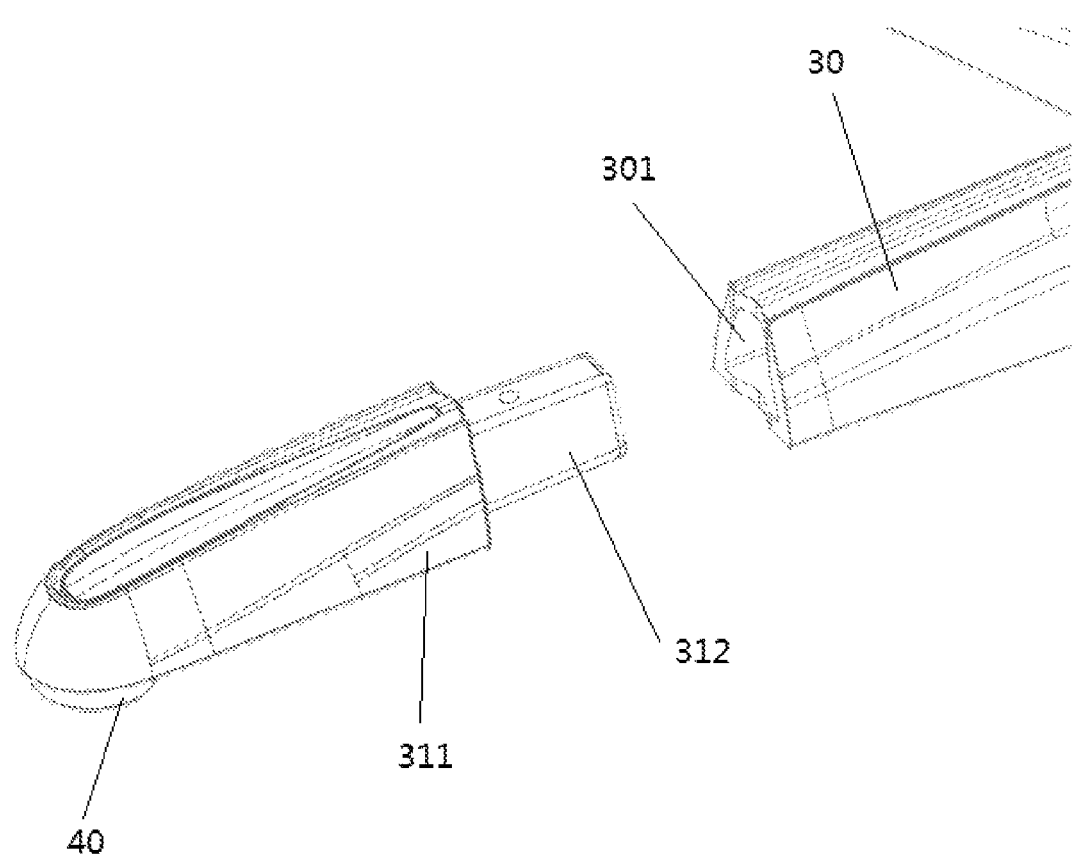
FIG. 3 is an oblique side view of the corresponding relationship between the disassembly and assembly components of the present invention and the first fixed arm.
Figure 4:
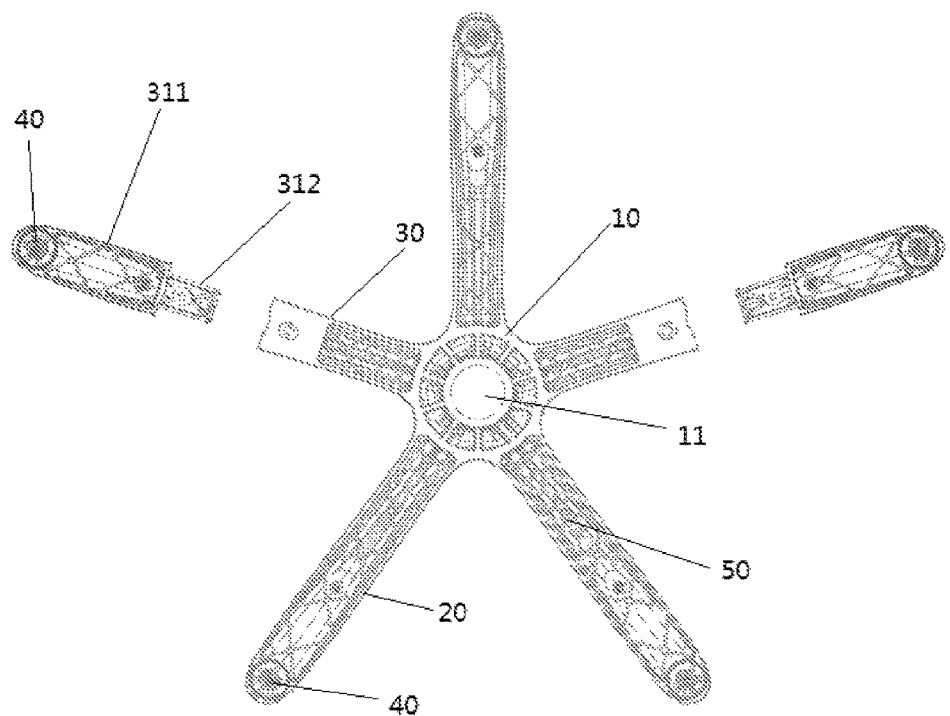
FIG. 4 is a top view of the overall structure of the utility patent application.
Figure 5:
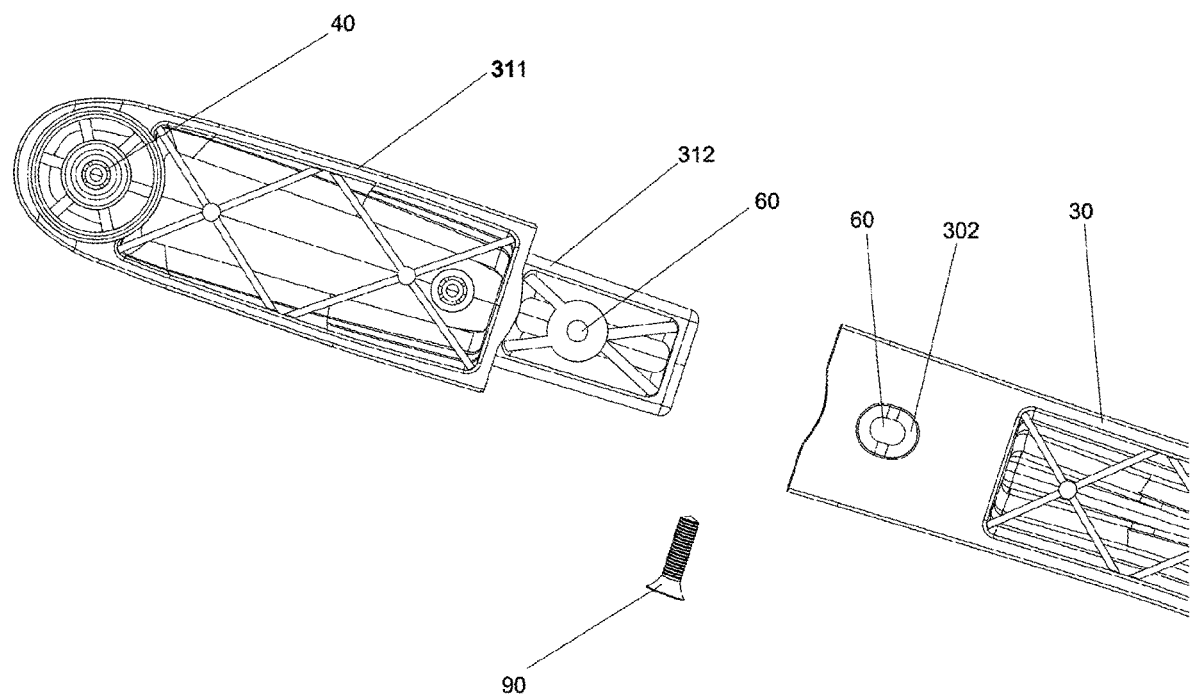
FIG. 5 is a top view of the corresponding relationship between the disassembly and assembly components of the present invention and the first fixed arm.
Figure 6:
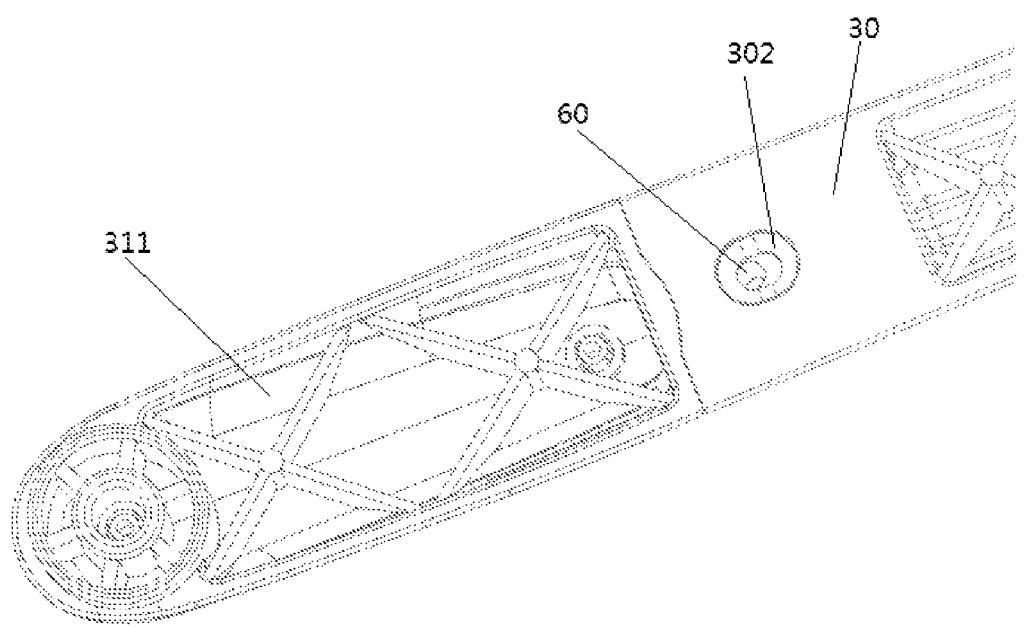
FIG. 6 is a schematic diagram of the matching relationship between the connecting holes of the plug-in board and the slot of the present invention.

Please refer to FIGS. 1-6, this utility patent application provides a technical solution:

A highly stable seat chassis, comprising a chair leg main body 10, the chair leg main body 10 has a plurality of extension arms extending in the circumferential direction, the chair leg main body 10 and the plurality of extension arms are integrally formed, with high structural strength and strong bearing capacity. The middle of the chair leg main body 10 is provided with a socket 11 for installing the seat body; the extension arm includes at least one first fixed arm 30, and the first fixed arm 30 is provided with a disassembly system 31; the disassembly system 31 includes dismounting arm 311, the insert plate 312 fixedly connected to the dismounting arm 311. The first fixed arm 30 is provided with a slot 301, the insert plate 312 and the slot 301 are provided with matching connecting holes 60, which are detached and connected by mounting bolts 90. When the insert plate 312 is inserted into the slot 301, the dismounting arm 311 and the first fixed arm 30 are connected, and the mounting bolt 90 is screwed in, and the mounting bolt 90 locks the dismounting arm 311.

The connecting hole 60 matching the insert plate 312 and the slot 301 is an eccentric hole, and the mounting bolt 90 is a taper-head bolt, so that when the mounting bolt 90 is tightened, the dismounting arm 311 can be tightened inward, and more, effectively preventing Loose.

Example 2

Please refer to FIGS. 1-6, this utility patent application provides a technical solution.

A highly stable seat chassis, comprising a chair leg body 10, the chair leg main body 10 has a plurality of extension arms extending in the circumferential direction, the chair leg main body 10 and the plurality of extension arms are integrally formed, with high structural strength and strong bearing capacity. The middle of the chair leg main body 10 is provided with a socket 11 for installing the seat body; the extension arm includes at least one first fixed arm 30, and the first fixed arm 30 is provided with a disassembly system 31: the disassembly system 31 includes dismounting arm 311, the insert plate 312 fixedly connected to the dismounting arm 311. The first fixed arm 30 is provided with a slot 301, the insert plate 312 and the slot 301 are provided with matching connecting holes 60, which are detached and connected by mounting bolts. When the insert plate 312 is inserted into the slot 301, the dismounting arm 311 and the first fixed arm 30 are connected, and the mounting bolt 90 is screwed in, and the mounting bolt 90 locks the dismounting arm 311. The more tightened, the tighter the dismounting arm 311, which effectively prevents loosening.

The connecting hole 60 matching the insert plate 312 and the slot 301 is an eccentric hole, and the mounting bolt 90 is a taper-head bolt, so that when the mounting bolt 90 is tightened, the dismounting arm 311 can be tightened inward, and more, effectively preventing looseness.

The extension arm also includes second fixed arms 20. The second fixed arms are provided without disassembly systems. There are two first fixed arms 30, three second fixed arms 20 in the circumferential direction of the leg body 10 at array arrangement. Two first fixed arms 30 are symmetrically arranged with one second fixed arm 20; the chair leg body 10, the first fixed arm 30, the second fixed arm 20, the dismounting arm 311 and the insert plate 312 are all shell structures. Staggered ribs 50 are respectively arranged inside, which further improves the structural strength of the seat chassis and reduces the overall weight.

The end of the second fixed arm 20 and the dismounting arm 311 away from the chair leg main body 10 is provided with a foot pad 40, and the foot pad 40 is in contact with the ground. When the disassembly system 31 is installed, the mounting bolts 90 will not protrude and be pressed against the ground, so as to ensure the stability of the seat chassis.

Specifically, through the disassembly system 31, the packaging volume of the finished product is reduced, thereby reducing logistics costs, and solving the problem of unrepairable looseness in existing products, and has good stability.

Although the embodiments of the present utility patent application have been shown and described, for those of ordinary skill in the art, it will be understood that various changes and modifications can be made to these embodiments without departing from the principle and spirit of the present utility patent application. For example, a highly stable seat chassis may comprise a chair leg main body having two outstretching arms. Alternatively, a highly stable seat chassis may comprise a chair leg main body having more than two outstretching arms. Replacements and modifications, the scope of the present invention is defined by the appended claims and their equivalents.

What is claimed is:

1. A highly stable seat chassis, comprising:
    a chair leg main body having a plurality of outstretching arms extending in a radial direction and spaced circumferentially around the chair leg main body;
    the plurality of outstretching arms comprises two first fixed arms and a plurality of second fixed arms, each first fixed arm having a disassembly system provided on an end of each first fixed arm, each second fixed arm provided without a disassembly system;
    wherein each disassembly system comprises a dismounting arm and an insert plate fixedly connected to the dismounting arm; the first fixed arm is provided with a slot, and the insert plate and the slot are provided with matching connecting holes.

2. The highly stable seat chassis according to claim 1, wherein the insert plate and the slot are connected with a mounting bolt.

3. The highly stable seat chassis according to claim 1, wherein each insert plate comprises a connecting hole and each first fixed arm comprises an eccentric hole.

4. The highly stable seat chassis according to claim 3, wherein the chair leg main body, portions of the first fixed arms, and the second fixed arms are integrally formed.

5. The highly stable seat chassis according to claim 3, wherein a bottom face of each insert plate includes the connecting hole, and a bottom face of each first fixed arm includes the eccentric connecting hole and each insert plate inserted into a respective slot aligns the connecting hole of the insert plate with the eccentric connecting hole of a respective first fixed arm.

6. The highly stable seat chassis according to claim 2, wherein the mounting bolt comprises a cone-head bolt.

7. The highly stable seat chassis according to claim 2, wherein a socket is provided in a middle of the chair leg main body.

8. The highly stable seat chassis according to claim 7, wherein the chair leg main body, first fixed arms, each of the second fixed arms, dismounting arms and insert plates are all shell structures having interiors that have staggered ribs.

9. The highly stable seat chassis according to claim 1, wherein the two first fixed arms and three second fixed arms are arranged in a circumferential array of the chair leg main body.

10. The highly stable seat chassis according to claim 1, wherein the two fixed arms are arranged symmetrically to a second fixed arm.

11. The highly stable seat chassis according to claim 1, wherein each second fixed arm and each dismounting arm are provided with a foot pad at one end away from the chair leg main body, and the foot pad is in contact with the ground.

12. The highly stable seat chassis according to claim 1, wherein each slot is provided with a circular arc outside a respective connecting hole.

13. The highly stable seat chassis according to claim 1, wherein the two first fixed arms are symmetrically arranged with one second fixed arm in between.

14. The highly stable seat chassis according to claim 1, wherein the two first fixed arms are symmetrically arranged with two second fixed arms in between.

15. The highly stable seat chassis according to claim 1, wherein the two first fixed arms are symmetrically arranged with one second fixed arm in between the two first fixed arms, the one second fixed arm extending in a first radial direction and wherein the two first fixed arms are arranged with two second fixed arms in between the two first fixed arms and each of the two second fixed arms extending in substantially opposing radial directions to the first radial direction.

* * * * *